United States Patent Office 2,947,736
Patented Aug. 2, 1960

2,947,736

RESIN COMPOSITIONS

Lennart A. Lundberg, Stamford, Conn., assignor to American Cyanamid Company, New York, N.Y., a corporation of Maine No Drawing. Filed Dec. 31, 1956, Ser. No. 631,417

16 Claims. (Cl. 260—88.3)

This invention relates to certain unsaturated halogenated cyanurates and isocyanurates and the polymerization products thereof.

With few exceptions, polyester resins, both thermosetting and thermoplastic, have stability against only a limited number of influences of a deleterious nature. And frequently these resins are modified to build up its stability against one factor; there is a loss in resistance against one or more other factors which are often encountered. For example, flame resistant resins, especially those containing chlorine or other halogens, usually have poor stability to ultraviolet light, that is they readily discolor upon prolonged exposure to intense sunlight. Although widely used, general purpose resins show poor resistance to aging at elevated temperatures. On the other hand, resins noted for having good retention of flexural strength upon prolonged heat aging often display one or more undesirable characteristics as to supporting combustion, being excessively brittle, crazing excessively on the surface or in shrinking excessively upon cure. Also some monomeric materials are subject to such violent exothermic reactions during polymerization that spontaneous combustion occurs. Accordingly, it is not strange that there is a continuing demand for new synthetic resins and especially those which demonstrate improved resistance to severe conditions of usage.

An object of the invention is to provide new resin-forming compositions.

Another object of the invention is to provide new polymers.

A further object of the invention is to provide improved flame-resistant resins.

Still another object of the invention is to provide flame-resistant resins having improved stability to other deleterious influences.

A still further object of the invention is to provide resins having superior resistance to heat, flame, crazing, shrinkage and ultraviolet light.

Other objects and advantages of the invention will be apparent to those skilled in the art upon consideration of the detailed disclosure hereinbelow.

It has been found that a wide variety of novel thermosetting and even thermoplastic polymers can be obtained from the novel compounds described hereinbelow. The invention, accordingly, comprises the polymeric products as well as both the monomeric halogenated esters and the partially polymerized but still polymerizable mixtures containing these esters, which esters in their monomeric form prior to halogenation are cyanuric acid triesters of the formula

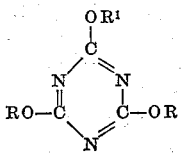

or isocyanuric acid triesters of the formula

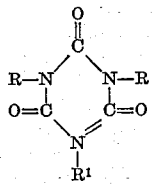

in which each R is an alkenyl radical of the group consisting of allyl and methallyl radicals and $R^1$ is an alkyl, allyl or methallyl radical. As subjects for halogenation, the triallyl cyanurate and dialyl monoalkyl cyanurates having 1 to 22 carbon atoms in the alkyl group appear to have the widest utility. Although chlorinated and brominated esters are preferred, this invention includes the iodine and fluorine esters.

A few of the many new compositions are chlorinated trimethallyl cyanurate, brominated triallyl isocyanurate, iodated trimethallyl isocyanurate, fluorinated triallyl cyanurate, chlorinated 2-amino-4,6-dialloxy-1,3,5-triazine, brominated diallyl methallyl cyanurate, chlorinated 2-butylamino-4,6-dimethalloxy-1,3,5-triazine, chlorinated methyl allyl methallyl isocyanurate, brominated 2-ethylamino-4,6-dimethalloxy-1,3,5-triazine, brominated-2-hydroxy-4,6-dialloxy-1,3,5-triazine, brominated-2-ethoxy-4,6-dimethalloxy-1,3,5-triazine, chlorinated diallyl octyl cyanurate, brominated diallyl lauryl cyanurate, chlorinated diallyl octadecyl cyanurate, etc.

The preparation of the unhalogenated unsaturated cyanuric and isocyanuric acid esters is known in the art and accordingly need not be detailed here. Halogenation of these is accomplished by contacting the liquid unsaturated ester with a gaseous, liquid or solid halogen while employing some form of cooling to control the reaction temperature. This is desirably followed by the application of a vacuum to the crude product to remove volatiles which might cause blistering during polymerization. It is necessary that the esters retain some degree of unsaturation in order to remain polymerizable, and this should generally amount to about 0.75 to 2.5 double bonds per monomeric cyanurate or isocyanurate ring. Accordingly, the quantity of combined halogen is preferably of the order of about 0.5 to about 2.25 mols of combined halogen per monomer unit. The reaction temperature is desirably between about 0° C. and about 40° C. It appears that higher temperatures promote the formation of polymers in the product. Nevertheless, some polymeric material is always present in the product of the halogenation reaction. These polymers are customarily of a rather low order such as dimers, trimers, etc. Usually a sizeable amount of polymer, which increases the viscosity of these liquids, is desirable in the product since the principal use of the halogenated esters is in laminating. However, the monomeric portion of the reaction product can be readily isolated by extraction with a suitable solvent such as hexane or petroleum ether. The polymeric fraction readily separates since it is insoluble in these solvents. The monomer has a special utility in those applications where its low viscosity is necessary or desirable.

It will, of course, be understood that tendencies of the present materials to form thermosetting or thermoplastic resins can be controlled or directed by controlling the residual unsaturation of the heterocyclic esters on a strictly monomeric basis. That is, linear polymers or thermoplastics are obtained by keeping the mols of unsaturation below 1 mol per molecule in the monomer.

There are a number of surprising effects and unpredictable advantages which are obtained with the novel compositions. One would ordinarily believe that a substantial halogen content in the new esters of cyanuric and isocyanuric acids would produce a number of quite undesirable effects including rendering the compounds extremely sensitive to discoloration by ultraviolet light and impossible to stabilize with the usual ultraviolet absorbing agents. In actual fact, the opposite is the case. Thus, contrary to expectations, the combined halogen here is unusually stable unlike prior art resins containing chlorine. A high degree of flame resistance is obtained as measured by an extremely low burning rate when samples of the new resins are held against an incandescent bar maintained at about 950° C. and also by the self-extinguishing characteristics displayed as soon as that bar is removed. Further, it is a distinct advantage to be able to convert a monomer to either a thermoplastic or thermosetting resin-forming material according to desire. Also, the new chlorinated materials produce certain advantages upon polymerization. Most important of these are lower exotherm, lower shrinkage, and significantly reduced surface crazing. When one contrasts the novel polymeric chlorinated triallyl cyanurate against the apparently closely related polytriallyl cyanurate, and it must be remembered that the latter is also quite combustible. Further, it is surprising that the new polymers have the same resistance to degradation against aging at 500° F. in view of the very substantial reduction in unsaturation of the new polymerizable compositions. Also it is not believed that one could predict with any certainty that these halogenated esters would have a distinctly higher and superior working viscosity for laminating purposes in comparison with the most closely related unhalogenated materials.

The good physical properties of the new resinous compositions endow them with broad utility in many fields including use as coating, film-forming materials, adhesives, binding agents, impregnating agents, molding compositions, laminating and casting resins and in reinforced plastic articles such as corrugated and flat structural panels. The present invention does not, however, encompass the combination of the novel, halogenated, unsaturated cyanurate and isocyanurate esters in copolymerizable combination with linear unsaturated alkyd or polyester resins derived fom polyhydric alcohols and polycarboxylic acids. That subject matter is disclosed in detail and claimed in my application Serial No. 632,031 filed January 2, 1957.

The conventional additives of the prior art may be used with the novel polymerizable compositions and generally it is recommended that they be employed in the usual or conventional quantities. These include promoters for use in conjunction with a catalyst to induce gelation and at least partial curing at temperatures of 75° F. or even lower as exemplified by cobalt naphthenate, benzamidine hydrochloride or ethylene guanidine hydrochloride, either alone or in combination with a mercaptan such as lauryl mercaptan; mold lubricants such as zinc stearate and glyceryl stearate, additional fire-retardant agents including compounds containing phosphorus; fillers and reinforcements like asbestos, glass fibers, alpha cellulose, clay, chopped textile fabrics, etc.; like hydroquinone to stabilize against premature gelation; colorants such as compatible dyes and pigments; and plasticizers.

As an optional ingredient of the new resin formulations, an ultraviolet light absorbing agent may be included in an amount ranging from about 0.05 to about 3.0% or more based on the total weight of polymerizable matter, 0.2 to 1.0% being preferred, to eliminate or minimize yellowing in the case of light-transmitting or light-colored products. This additive is unnecessary for dark resin formulations. The class of hydroxylated benzophenones, including those containing other substituents, is especially recommended since this group of compounds does not undergo any color change upon absorbing ultraviolet radiation. A few of the many suitable agents are 2,2'-dihydroxy-4-methoxybenzophenone, 2,2'-dihydroxy-4,4'-dimethoxybenzophenone, 2-hydroxy-4 - methoxybenzophenone, 2 - hydroxy - 4' - methoxybenzophenone, 2 - hydroxy - 4,4' - dimethoxybenzophenone, 2,4-dihydroxybenzophenone, 2-hydroxy-5-salicylylbenzophenone, and like compounds.

The presence of a catalyst is usually desirable to effect the polymerization of the novel unsaturated esters. Catalysts of the well-known peroxide class are preferred. The amount of the catalyst employed may vary over rather wide limits to give varying catalyzed stability. Thus, from about 0.1% to about 10% by weight, based on the total weight of the polymerizable composition, may be used. Preferably, from about 0.2 to about 2% by weight of the catalyst, based on the total weight of the polymerizable resinous composition, gives the desired results. A faster rate of cure usually results from increasing the catalyst content within the aforementioned limits. A few examples of the many suitable organic peroxide catalysts are benzoyl peroxide, succinyl peroxide, acetyl peroxide, methyl ethyl ketone peroxide, di-tertiary butyl peroxide, cumene hydroperoxide, tertiary butyl hydroperoxide, cyclohexanone peroxide, perbenzoic acid, peracetic acid, anisoyl peroxide, toluyl peroxide, p-bromobenzoyl peroxide, tertiary butyl perbenzoate, p-menthane hydroperoxide, pinane hydroperoxide, diisopropylbenzene hydroperoxide, tertiary butyl peracetate, 1 - cyclohexanol - 1 - hydroperoxide, furoyl peroxide and chloracetyl peroxide; or any organic ozonide, such as diisopropylene ozonide, diisobutylene ozonide or mixtures thereof. Other free radical type polymerization catalysts that may also be used are such as $\alpha,\alpha$-azodiisobutyronitrile, the salts of inorganic per-acids, e.g., ammonium persulfate, sodium persulfate, and the like.

Curing of any of the new liquid resin compositions may be accomplished with or without added pressure in the atmosphere or in closed molds at temperatures ranging from about 10° C. up to 150° C. or even higher temperatures as long as they are kept below the point at which resin degradation commences. Where convenient, it is often desirable to form the copolymers by heating the catalyzed resin-forming mass to between 90 and about 120° C. for a period of about 10 to 90 minutes to expedite production.

While gelation and sometimes curing may be accomplished at relatively low temperatures of the order of room temperature, post-curing is often highly desirable to impart optimum properties especially in respect to retention of flexural strength under prolonged heat aging. This may be accomplished by raising the temperature after curing while the cured article is not retained necessarily in any mold or press from a temperature from about 250° F. to about 500° F. either uniformly or in a graduated series of steps over a period occupying about 6 hours.

Although the polymerizable compositions of the present invention are not compatible with all other synthetic resin-forming substances, they may be copolymerized with certain compatible unsaturated monomers including methyl acrylate, ethyl acrylate, methyl methacrylate, ethyl methacrylate, and a wide variety of other acrylates including isobutyl acrylate, dodecyl acrylate, 2-chloroethyl acrylate, cyclohexyl acrylate and the corresponding methacrylate esters as well as a considerable range of allyl compounds such as diallyl phthalate, tetrachlorodiallyl phthalate, allyl alcohol, methallyl alcohol, allyl acetate, allyl methacryate, diallyl carbonate, allyl lactate, allyl alphahydroxy isobutyrate, allyl trichlorosilane, allyl acrylate, diallyl malonate, diallyl oxalate, diallyl gluconate, diallyl methylgluconate, diallyl adiphate, diallyl sebacate, diallyl citraconate, the diallyl ester of muconic acid, diallyl itaconate, diallyl chlorophthalate, diallyl dichlorosilane, the diallyl ester of endomethylene tetrahydrophthalic anhydride, triallyl tricarballylate, triallyl aconitate, triallyl citrate, triallyl cyanurate, triallyl phosphate, trimethallyl phosphate, tetraallyl silane, tetraallyl silicate, hexallyl disiloxane, and the like. It will, of course, be understood that these monomers modify the characteristics of the resins considerably and while certain advantages will be gained, nevertheless, depending on the amount of such comonomers employed, there will usually be a distinct loss in certain qualities such as flame resistance and strength characteristics in the aging period. Thus, for many purposes, little or nothing is to be gained by modifying the polymerizable compositions disclosed herein as novel.

For a better understanding of the nature and objects of the present invention, reference should be had to the accompanying illustrative examples which are not of a limiting nature and in which all proportions are expressed in terms of weight unless otherwise stated therein.

*Example 1*

Chlorine is bubbled into 231 parts by weight (0.93 mol) of triallyl cyanurate in a closed reaction vessel equipped with an agitator, and a thermometer. The temperature is allowed to rise to 45° C. and then held at that level by passing cooling water through a jacket on the reaction vessel. Stirring is employed throughout the entire reaction, and the addition of chlorine is terminated after 74.8 parts (1.05 mols) is added over a period of 80 minutes. The resulting chlorinated triallyl cyanurate is a moderately viscous, pale straw-colored syrup.

A batch of 26.45 parts of this syrup is catalyzed with 0.132 part of benzoyl peroxide, poured into a tray and placed in an oven maintained at 80° C. After 16 hours, it is observed that the syrup has polymerized to a crystal clear brittle solid.

A second sample amounting to 24.6 parts is thoroughly mixed with 0.2 part by volume of tert-butyl hydroperoxide as a catalyst and then heated overnight at 100° C. The resulting resin is quite similar in appearance to that described above except that it has a light yellow but clear color. Both resin samples exhibit good flame resistance and are self-extinguishing.

*Example 2*

Over a period of 1.75 hours, chlorine is passed with continuous stirring into a homogeneous mixture of 1.31 mols of triallyl cyanurate and 320 parts of carbon tetrachloride with the temperature kept below 20° C. by cooling. The somewhat viscous solution is chilled in an attempt to induce crystallization, but no crystals are formed. The solution is then concentrated using reduced pressure and gentle heating with the pressure reaching a minimum of 6 mm. Hg and the temperature a high of 37° C. The product is a viscous syrup in a yield amounting to 70.7 parts which represents an addition of 0.76 mol of chlorine per mol of triallyl cyanurate.

An 18.55 part sample of the product is mixed with 0.093 part of benzoyl peroxide and heated overnight at 80° C. to polymerize into a transparent, hard, brittle, glossy, slightly yellow resin. This also is found to have good flame resistance although not as high as the product of Example 1.

*Example 3*

In a similar manner, except for maintaining the reaction temperature between 45 and 55° C. over a 75-minute period, 1.8 mols of chlorine is added to 1 mol of triallyl cyanurate. No color develops in the reaction mixture during the early stages of the reaction, but toward the end, the pickup of chlorine becomes sluggish as evidenced by a yellow color appearing in the initially colorless mixture and by the presence of unabsorbed chlorine gas above the liquid. However, when the flow of chlorine is stopped, the yellow coloration quickly disappears indicating that the reaction is still proceeding. The reaction mixture is finally placed under vacuum to remove any volatile matter from the nearly water-white, highly viscous syrup.

A 20-part sample catalyzed with 0.1 part by volume of tert-butyl hydroperoxide is polymerized first at 80° C. and then at 120° C. to form a light yellow, brittle resin. It is noted that the resin is somewhat soft and rubbery at 120° C. before cooling to room temperature.

*Example 4*

Using the same apparatus, chlorine is bubbled into 4.83 mols of triallyl cyanurate over 4 hours with the reaction temperature maintained between 40–45° C. until a total of 5.46 mols of the chlorine gas is taken up. Volatile material, mainly allyl chloride, is removed by applying a vacuum to the kettle for somewhat over 3 hours with the vacuum being applied gradually to avoid excessive frothing. A clear pale straw-colored viscous syrup is obtained with a viscosity of 98.5 to 148 poise at 25° C. (Z5–Z6 on Gardner-Holdt scale), an iodine value of 129, and a chlorine content by weight of 20.88% by analysis and 20.40% by increase in weight. From these values, it is calculated that the molar ratio of chlorine to triallyl cyanurate in the product is 0.92:1 on a monomeric basis. The mols of unsaturation per mol of triallyl cyanurate is calculated as 1.59 based on the iodine number and 2.08 based on the weight of chlorine taken up. This discrepancy in residual unsaturation is thought to be due to the formation of dimers or other low order polymers. The degree of polymerization calculated from the iodine number is 24.3%.

A type 181 glass cloth with a type 301 vinyl silane finish is impregnated with a portion of this chlorinated triallyl cyanurate in admixture with 1% of a catalyst in the form of an equal mixture of benzoyl peroxide and tricresyl phosphate and a 12-ply laminate is prepared by pressing for 1 hour at 302° F. at 15 p.s.i. followed by a step-wise postcuring at 250° F. for 1.5 hours, 350° F. for 1.5 hours, 425° F. for 1.5 hours and 2 hours at 500° F. Upon inspecting the laminate under a microscope, it is observed that it is substantially free of crazing whereas a laminate prepared in exactly the same fashion from triallyl cyanurate develops an excessively crazed surface during the necessary postcuring. Also the laminate containing the chlorinated resin is self-extinguishing and resists burning to a notably greater degree than a similar laminate prepared with unhalogenated triallyl cyanurate. Other desirable physical properties in a reinforced resin are apparent from the following data on the halogen-containing laminate.

| | |
|---|---|
| Barcol hardness | 45–55 |
| Percent $H_2O$ absorption | 3.3 |
| Flex. strength in p.s.i.: | |
|   At 75° F | 42,400 |
|   At 500° F. after ½ hour at 500° F | 34,500 |
|   At 500° F. after 192 hours at 500° F | 14,300 |
| Flex. modulus $\times 10^{-6}$: | |
|   At 75° F | 2.9 |
|   At 500° F. after ½ hour at 500° F | 2.3 |
|   At 500° F. after 192 hours at 500° F | 2 |

Another sample of the liquid chlorinated triallyl cyanurate is catalyzed with 1% of the same catalyst mixture; then a ⅛" thick casting is poured into a cell made up of glass plates and cured for 18 hours at a temperature which is gradually increased from 125 to 250° F. This is followed by postcuring for 16 hours at 310° F. A clear casting is obtained with a Barcol hardness of about 45 and a burning rate of only 0.16" per minute when tested with a Glo-Bar heated to 950° C. in accordance with the specifications of Test Method No. 757 of the American Society for Testing Materials. An attempt to prepare a specimen of polytriallyl cyanurate for the burning rate test in the same manner fails because the brittle resin cracks badly in curing.

Another sample of the chlorinated cyanuric ester is blended with 0.5% of benzoyl peroxide and 0.5% of tricresyl phosphate and then cured in glass cells from the liquid to the solid state at temperatures increased stepwise from 175 to 350° F. over a period of about 30 hours. The shrinkage amounts to only 7.2% whereas a sample of triallyl cyanurate polymerized in exactly the same fashion is found to shrink 13.5%.

*Example 5*

A sample of chlorinated triallyl cyanurate is prepared along the lines indicated in Example 4 and the chlorine content is found to be 19.5% by analysis. 103 parts of this material is mixed with 212 parts of hexane and heated to boiling. Next, the liquid mixture is allowed to separate, and the supernatant hexane layer is decanted. The remaining layer is extracted twice more in 100-part portions of the hexane in the same manner. Later, after drying in a vacuum dessicator, the residue is observed to be a gummy viscous resin. The extracts are combined and distilled under vacuum to strip off the hexane and leave 50 parts of a free-flowing light yellow, liquid product. This material is essentially monomeric chlorinated triallyl cyanurate with a chlorine content of 17.94% as determined by the sodium fusion method.

A sample of the monomer is catalyzed by stirring in 0.8% of tert-butyl hydroperoxide and hardened by heating to 100° C. for 16 hours in polymerizing it to a self-extinguishing resin of good physical properties.

*Example 6*

Chlorine is bubbled into 939 parts of triallyl cyanurate while the reaction temperature is maintained at 30–35° C. for 1.5 hours to produce a gain in weight amounting to 153 parts. The clear, pale syrup is concentrated under vacuum with heating to a temperature eventually reaching 80–85° C. and a final pressure of less than 1 mm. Hg. The viscosity of the syrup is 5.5 poise and the iodine number is 229 while the chlorine content amounts to about 12.7%, which is equivalent to 0.51 mol of combined chlorine per mol of triallyl cyanurate charged. From this, the degree of polymerization is believed to be 3%.

A sample of this resin-forming material cured in the manner indicated in the last paragraph of Example 4 has a shrinkage of 10.4% even though the chlorine content is relatively low whereas unhalogenated triallyl cyanurate displays a shrinkage of 13.5% under the same conditions.

*Example 7*

Chlorine is passed into triallyl cyanurate for 5 hours with the temperature at 40–45° C.; then for an additional 3 hours with the temperature at 50–55° C. with a total of 560 parts of chlorine being taken up. Next, the reaction vessel is evacuated as described above for 3 hours, and the product is heated during the final hour to 40–45° C. The weight loss of the reaction mass amounts to 42 parts during this stripping treatment. Assuming this weight loss to consist entirely of allyl chloride (identified by infrared analysis), it is calculated that the product contains 1.95 mols of chlorine per mol of triallyl cyanurate. The viscous liquid is found to have an iodine number of 44.5 centigrams of iodine per gram of sample and a viscosity greater than 1066 poise. The mols of unsaturation per mol of triallyl cyanurate charged is calculated to be 0.68 based on the iodine number and 1.05 based on the weight of chlorine taken up. The degree of polymerization based on the iodine number is estimated to be 35.2% by weight.

*Example 8*

Example 4 is repeated with trimethallyl cyanurate substituted for triallyl cyanurate on a mol for mol basis. A similar reaction product is obtained which is polymerizable in the same manner, and cast and laminated products display similar physical properties especially in respect to flame resistance and surface characteristics.

*Example 9*

The procedure of Example 4 is again duplicated except for substituting triallyl isocyanurate prepared according to Patent No. 2,536,849 for triallyl cyanurate in the same molar proportions. A similar chlorinated product is obtained which is polymerizable in the same manner. Castings display similar physical properties in general, especially in respect to flame resistance and surface characteristics, but their flexural strength at elevated temperatures is below that of chlorinated triallyl cyanurate products.

*Example 10*

The procedure of Example 3 is followed once more using trimethallyl isocyanurate in lieu of the triallyl cyanurate on an equal mols basis. A similar liquid reaction product is obtained which is polymerized in the manner of Example 3 to yield a solid product of like characteristics.

*Example 11*

1 gram mol of liquid bromine is added dropwise to 1 mol of triallyl cyanurate in a glass laboratory flask over a period of 1 hour with constant stirring to maintain the reaction temperature at about 25° C. The reaction mixture gradually assumes a reddish-brown color while the bromine is being added, but after all of the bromine is in, that color slowly disappears as stirring is continued. Finally, the reaction flask is evacuated to a pressure of only a few millimeters of mercury with gentle heating to remove any volatile matter. The resulting brominated triallyl cyanurate is a yellowish viscous liquid.

A flame-resistant homopolymeric product is formed by thoroughly mixing in 0.5% of benzoyl peroxide and heating the catalyzed resin overnight at 60° C. in a glass cell, then raising the temperature to 120° C. gradually over a 6-hour period.

*Example 12*

Trimethallyl isocyanurate is reacted with an equimolar quantity of liquid bromine in the manner described in Example 12. The product, brominated trimethallyl isocyanurate, is catalyzed with 1% of the benzoyl peroxide-tricrecyl phosphate mixture and cast in the manner described in Example 4 to produce an infusible resin which has a very low burning rate.

*Example 13*

A mixed ester corresponding approximately to diallyl monobutyl cyanurate is prepared by an ester-interchange reaction in which 2 mols of n-butanol is heated with 1 mol of triallyl cyanurate and about 0.025 mol of sodium methylate as a catalyst at a temperature ranging from 99° C. to 107.5° C. over a period of about four and one-half hours while allyl alcohol (approximately 1 equiv./mol triallyl cyanurate) is allowed to distill off into a receiver. The reaction mixture is neutralized with acetic acid and washed with water to remove soluble salts. After stripping off unreacted butyl alcohol by vacuum distillation, a transparent, light yellow syrup is obtained with an iodine number of 206.8. This corresponds to a residual unsaturation of 2.14 mols per mol of cyanurate ester charged, and the remaining 0.86 mol is the combined butanol content.

Chlorine is bubbled at a rate of 500 ml./minute into 526 grams of the butyl allyl cyanurate prepared above. A water bath surrounding the flask is used to maintain the reaction temperature at 35–45° C. as the addition of chlorine is continued until a total of 141 grams is taken up. The vacuum line equipped with a Dry Ice trap is attached to the reaction vessel to remove volatile matter over a period of 25 minutes as the liquid reaction mixture is gently heated to a maximum temperature of 48° C. A total of 28.7 grams of a water-white liquid, corresponding to the exact weight loss of the reaction mass, is removed from the trap and found to contain around 67% allyl chloride by means of infrared analysis. The product is a yellow viscous syrup with a 27.0–36.2 poise at 25° C. For simplicity, it may be called chlorinated diallyl butyl cyanurate based on the iodine number and the percent of total chlorine. For each mol of triallyl cyanurate charged, the produced contains 0.86 mol of combined butanol, 0.935 allyl group and 0.85 mol of dichloropropyl group. It may also be postulated that the remaining 0.355 radical per mol of original cyanuric ester is made up of —CH$_2$—CHCl—CH$_2$—CH$_2$—CHCl—CH$_2$— radicals linking the cyanuric acid rings in low order polymers. This would explain the high viscosity of the above product and also account for the greater theoretical or calculated degree of unsaturation based on simple beta-gamma addition of chlorine to the double bonds than the lower value based on the actual iodine value determinations.

To form a laminating syrup, the chlorinated diallyl butyl cyanurate is mixed with 0.5% by weight of benzoyl peroxide and 0.5% of tricresyl phosphate. A type 181 glass cloth having a type 301 finish is immersed in the catalyzed syrup; then 12 plies of the cloth are assembled in the press and cured for 1 hour at 325° F. followed by removal from the press and postcuring in an oven for 1 hour at 250° F., 1 hour at 350° F., 1 hour at 425° F. and finally 2 hours at 500° F. in sequence. The resulting laminate has excellent surface characteristics in respect to crazing, etc., In addition, this laminate displays outstanding retention of flexural strength and modulus upon prolonged aging for 192 hours at the extremely high temperature of 500° F. In this severe test, the flexural strength is found to be 21,700 p.s.i. and the modulus is calculated to be 2.2×10$^{-6}$. A similar laminate prepared from triallyl cyanurate had a flexural strength at 500° F. of only 11,900 p.s.i. after aging 192 hours at 500° F., and a flexural modulus of 1.8×10$^{-6}$.

While only a limited number of embodiments of the compositions of the present invention are disclosed above, it is possible to produce still other embodiments without departing from the inventive concept herein disclosed, and it is desired, therefore, that only such limitations be imposed on the appended claims as are stated therein or required by the prior art.

I claim:
1. A composition of matter comprising a polymerized product obtained by reacting a triester of an acid selected from the group consisting of cyanuric and isocyanuric and corresponding to one of the formulas

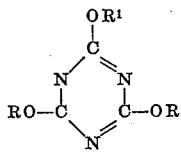

and

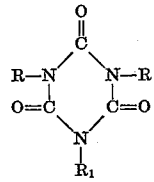

in which R$^1$ is a member of the group consisting of alkyl, allyl and methallyl and R is a member of the group consisting of allyl and methallyl with a halogen until the amount of combined halogen is from about 0.5 to 2.25 mols per mol of the ester, said halogenation product containing residual ethylenic unsaturation, and then polymerizing the resulting halogenated material by heating it in the presence of a polymerization catalyst.

2. A polymer obtained by reacting diallylbutyl cyanurate with chlorine until the amount of combined chlorine is from about 0.5 to 1.25 mols per mol of said cyanurate ester and then polymerizing the chlorinated product by heating it in the presence of a polymerization catalyst.

3. A polymer obtained by reacting triallyl cyanurate with chlorine until the amount of combined chlorine is from about 0.5 to 2.25 mols per mol of said cyanurate ester and then polymerizing the chlorinated product by heating it in the presence of a polymerization catalyst.

4. A polymer obtained by reacting trimethallyl cyanurate with chlorine until the amount of combined chlorine is from about 0.5 to 2.25 mols per mol of said cyanurate ester and then polymerizing the chlorinated product by heating it in the presence of a polymerization catalyst.

5. A polymer obtained by reacting triallyl isocyanurate with chlorine until the amount of combined chlorine is from about 0.5 to 2.25 mols per mol of said isocyanurate ester and then polymerizing the chlorinated product by heating it in the presence of a polymerization catalyst.

6. A polymer obtained by reacting triallyl cyanurate with bromine until the amount of combined bromine is from about 0.5 to 2.25 mols per mol of said cyanurate ester and then polymerizing the brominated product by heating it in the presence of a polymerization catalyst.

7. As a novel polymerizable composition of matter, a halogenation product obtained by reacting a triester of an acid selected from the group consisting of cyanuric and isocyanuric and corresponding to one of the formulas

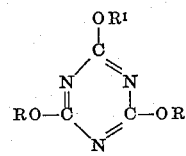

and

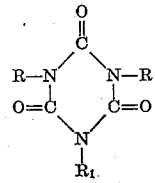

in which R$^1$ is a member of the group consisting of alkyl, allyl and methallyl and R is a member of the group consisting of allyl and methallyl with a halogen until the amount of combined halogen is from about 0.5 to 2.25 mols per mol of the ester, said halogenation product containing residual ethylenic unsaturation.

8. As a novel polymerizable composition of matter, a halogenation product obtained by reacting a diallyl alkyl cyanurate with a halogen until the amount of combined halogen is from about 0.5 to 1.25 mols per mol of said cyanurate ester.

9. As a novel polymerizable composition of matter, a chlorination product obtained by reacting diallyl butyl cyanurate with chlorine until the amount of combined chlorine is from about 0.5 to 1.25 mols per mol of said cyanurate ester.

10. As a novel polymerizable composition of matter, a halogenation product obtained by reacting triallyl cyanurate with a halogen until the amount of combined halogen is from about 0.5 to 2.25 mols per mol of said cyanurate ester.

11. As a novel polymerizable composition of matter, a halogenation product obtained by reacting trimethallyl cyanurate with a halogen until the amount of combined halogen is from about 0.5 to 2.25 mols per mol of said cyanurate ester.

12. As a novel polymerizable composition of matter, a halogenation product obtained by reacting triallyl isocyanurate with a halogen until the amount of combined halogen is from about 0.5 to 2.25 mols per mol of said isocyanurate.

13. As a novel polymerizable composition of matter, a chlorination product obtained by reacting triallyl cyanurate with chlorine until the amount of combined chlorine is from about 0.5 to 2.25 mols per mol of said cyanurate ester.

14. As a novel polymerizable composition of matter, a chlorination product obtained by reacting trimethallyl cyanurate with chlorine until the amount of combined chlorine is from about 0.5 to 2.25 mols per mol of said cyanurate ester.

15. As a novel polymerizable composition of matter, a chlorination product obtained by reacting triallyl isocyanurate with chlorine until the amount of combined chlorine is from about 0.5 to 2.25 mols per mol of said isocyanurate ester.

16. As a novel polymerizable composition of matter, a bromination product obtained by reacting triallyl cyanurate with bromine until the amount of combined bromine is from about 0.5 to 2.25 mols per mol of said cyanurate ester.

References Cited in the file of this patent

UNITED STATES PATENTS

| | | |
|---|---|---|
| 2,510,503 | Kropa | June 6, 1950 |
| 2,537,816 | Dudley | Jan. 9, 1951 |
| 2,631,148 | Nelb | Mar. 10, 1953 |
| 2,741,606 | Holt et al. | Apr. 10, 1956 |

UNITED STATES PATENT OFFICE
CERTIFICATION OF CORRECTION

Patent No. 2,947,736                                       August 2, 1960

Lennart A. Lundberg

It is hereby certified that error appears in the above numbered patent requiring correction and that the said Letters Patent should read as corrected below.

Column 6, line 60, in the tabulation, for "2" read -- 2.1 --; column 8, line 42, for "tricrecyl" read -- tricresyl --; column 9, line 5, for "produced" read -- product --.

Signed and sealed this 27th day of June 1961.

(SEAL)
Attest:

ERNEST W. SWIDER
Attesting Officer

DAVID L. LADD
Commissioner of Patents